(12) United States Patent
Ederer et al.

(10) Patent No.: US 10,946,556 B2
(45) Date of Patent: Mar. 16, 2021

(54) METHOD AND CASTING MOLD, IN PARTICULAR FOR USE IN COLD CASTING METHODS

(71) Applicant: Voxeljet AG, Friedberg (DE)

(72) Inventors: Ingo Ederer, Geltendorf (DE); Daniel Günther, Munich (DE); Anton Gruber, Aindling (DE)

(73) Assignee: VOXELJET AG, Friedberg (DE)

( * ) Notice: Subject to any disclaimer, the term of this patent is extended or adjusted under 35 U.S.C. 154(b) by 431 days.

(21) Appl. No.: 15/500,258

(22) PCT Filed: Jul. 30, 2015

(86) PCT No.: PCT/DE2015/000378
§ 371 (c)(1),
(2) Date: Jan. 30, 2017

(87) PCT Pub. No.: WO2016/019937
PCT Pub. Date: Feb. 11, 2016

(65) Prior Publication Data
US 2017/0210037 A1    Jul. 27, 2017

(30) Foreign Application Priority Data
Aug. 2, 2014 (DE) ............... 10 2014 001 236.5

(51) Int. Cl.
*B29C 33/38* (2006.01)
*B28B 7/34* (2006.01)
(Continued)

(52) U.S. Cl.
CPC ............ *B29C 33/3842* (2013.01); *B28B 1/14* (2013.01); *B28B 7/346* (2013.01); *B28B 7/348* (2013.01); *B28B 7/36* (2013.01); *B28B 7/38* (2013.01); *B29C 33/3807* (2013.01); *B29C 33/56* (2013.01); *B29C 64/153* (2017.08); *B33Y 10/00* (2014.12); *B33Y 40/00* (2014.12); *B33Y 80/00* (2014.12); *B29C 33/38* (2013.01)

(58) Field of Classification Search
CPC ........................... B29C 33/3842; B33Y 10/00
See application file for complete search history.

(56) References Cited

U.S. PATENT DOCUMENTS 3,913,503 A    10/1975    Becker
4,247,508 A    1/1981    Housholder
(Continued)

FOREIGN PATENT DOCUMENTS

AU    720255 B2    5/2000
DE    3221357 A1    12/1983
(Continued)

OTHER PUBLICATIONS

US 4,937,420 A, 06/1990, Deckard (withdrawn)
(Continued)

*Primary Examiner* — Austin Murata
(74) *Attorney, Agent, or Firm* — The Dobrusin Law Firm, P.C.

(57) ABSTRACT

The invention relates to a casting mold, in particular for use in cold casting methods, which is produced with the aid of a powder-based layering method, the final casting mold having a treated surface.

17 Claims, 8 Drawing Sheets

(51) Int. Cl.
  *B28B 7/36* (2006.01)
  *B33Y 80/00* (2015.01)
  *B28B 7/38* (2006.01)
  *B33Y 40/00* (2020.01)
  *B29C 64/153* (2017.01)
  *B33Y 10/00* (2015.01)
  *B28B 1/14* (2006.01)
  *B29C 33/56* (2006.01)

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,662,956 A * | 9/1997 | Knightly .................. A21D 8/08 426/601 |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,112,804 A | 9/2000 | Sachs et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,446,703 B1 * | 9/2002 | Roder ................ B22D 11/0605 164/455 |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |

(56) References Cited

U.S. PATENT DOCUMENTS

| | | |
|---|---|---|
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0140078 A1* | 7/2004 | Liu .................. B22C 9/04 164/34 |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0008055 A1* | 1/2009 | Marutani ............. B22C 9/00 164/19 |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0212584 A1 | 8/2010 | Ederer et al. |
| 2010/0207288 A1 | 9/2010 | Enrico |

(56) References Cited

U.S. PATENT DOCUMENTS

| | | |
|---|---|---|
| 2010/0243123 A1 | 9/2010 | Voxeljet |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0088023 A1* | 4/2012 | Begun .............. A23G 1/0063 426/515 |
| 2012/0094026 A1 | 4/2012 | Ederer et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0004329 A1* | 1/2014 | Mune ............... D04H 3/00 428/220 |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2014/0332997 A1* | 11/2014 | Shih .............. B29C 41/42 264/138 |
| 2014/0339745 A1* | 11/2014 | Uram .............. C04B 35/19 264/681 |
| 2015/0035191 A1* | 2/2015 | McEvoy .............. B29C 33/58 264/41 |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0174644 A1* | 6/2015 | Deters .............. B22C 1/188 164/37 |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0303798 A1* | 10/2016 | Mironets ............. B22F 3/1055 |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2016/0368224 A1* | 12/2016 | Ooba ............... B29C 64/40 |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Gunther et al. |
| 2017/0217098 A1 | 8/2017 | Hartmann et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 0361847 B1 | 4/1990 |
| EP | 1415792 | 5/2004 |
| EP | 1457590 A | 9/2004 |
| EP | 1381504 B1 | 8/2007 |
| EP | 1974838 A1 | 10/2008 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 97/28909 A1 | 8/1997 |
| WO | 01/40866 A2 | 6/2001 |
| WO | 2001/078969 A2 | 10/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/131388 A1 | 4/2014 |
| WO | 2014/090207 A1 | 6/2014 |
| WO | 2014/166469 A1 | 10/2014 |
| WO | 2015/078430 A1 | 6/2015 |
| WO | 2015/081926 A1 | 6/2015 |
| WO | 2015/085983 A2 | 6/2015 |
| WO | 2015/090265 A1 | 6/2015 |
| WO | 2015/090567 A1 | 6/2015 |
| WO | 2015/096826 A1 | 7/2015 |
| WO | 2015/149742 A1 | 10/2015 |
| WO | 2015/180703 A1 | 12/2015 |
| WO | 2016/019937 A1 | 2/2016 |
| WO | 2016/019942 A1 | 2/2016 |
| WO | 2016/058577 A1 | 4/2016 |
| WO | 2016/095888 A1 | 6/2016 |

(56) References Cited

FOREIGN PATENT DOCUMENTS

| WO | 2016/101942 A1 | 6/2016 |
|---|---|---|
| WO | 2016/146095 A1 | 9/2016 |

OTHER PUBLICATIONS

International Search Report, Application No. PCT/DE2015/000378, dated Jan. 12, 2015.
Written Opinion of the International Search Authority, Application No. PCT/DE2015/000378, dated Jan. 12, 2015.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner

METHOD AND CASTING MOLD, IN PARTICULAR FOR USE IN COLD CASTING METHODS

CLAIM OF PRIORITY

This application is a national phase filing under 35 USC § 371 of PCT Application serial number PCT/DE2015/000378 filed on Jul. 30, 2015, and claims priority therefrom. This application further claims priority to German Patent Application Number DE 10 2014 001 236.5 filed on Aug. 2, 2014. PCT Application Number PCT/DE2015/000378 and German Patent Application Number DE 10 2014 001 236.5 are each incorporated herein by reference in its entirety.

FIELD

The present invention relates to a casting mold that is produced with the aid of a powder-based layering method, a use of the casting mold and a method for the production thereof.

BACKGROUND

A method for producing three-dimensional objects from computer data is described in the European patent specification EP 0 431 924 B1. In this method, a particulate material is applied in a thin layer to a platform, and a fluid is selectively printed on the particulate material with the aid of a print head. In the area onto which the fluid is printed, the particles bind to each other, and the area solidifies under the influence of the fluid and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of the layering techniques, 3D printing based on powdered materials and the supply of fluids with the aid of a print head is the fastest method.

This method may be used to process different particulate materials, including natural biological raw materials, polymers, metals, ceramics and sands (not an exhaustive list).

The strengths of the submitted method lie in the high volume capacity and the cost-effective production. However, the material properties often lag behind those known from conventional production.

For example, a material may be produced which uses sand particles as the base material and is bound by cement. This material is a type of concrete. The strength of a material of this type is, however, much lower than that of conventionally produced concrete, due to its porosity.

Sand particles having other binding systems may also be processed by the powder-based 3D printing process. This includes, among other things, cold resin binding, which is used in foundry practice as well as in 3D printing.

Inorganic binders are also state of the art in this area. These are the most environmentally friendly alternative to cold resin binders in foundry practice.

These materials also do not directly achieve strengths that are relevant, e.g., for construction. In principle, only a few materials may be processed into dense and high-strength materials with the aid of the powder-based 3D printing method. These materials are essentially polymers.

The use of two-stage methods is one way around this limitation in 3D printing. In this case, casting in 3D-printed molds is one option. This method is state of the art in the area of metal casting.

In the area of concrete materials or cold-castable polymers, processing with the use of 3D-printed molds is not common practice for casting methods. On the one hand, this is due to the lack of the breakout and core removal capability, which is due to the absence of the solidity-reducing effect of heat in the cold casting process. On the other hand, an undesirable bonding of the casting material to the mold may build up during cold casting, since a 3D-printed casting mold has a relatively high porosity for cold casting methods, into which the casting material may penetrate.

It is known from the prior art that reusable molds may generally be used for casting concrete parts.

For example, coated wooden boards are used as formwork when casting straight walls. These boards are additionally pretreated with a formwork oil, thereby preventing the concrete from sticking to the multiple-use boards.

To remove the formwork, these boards are usually peeled away from the concrete part by pounding them with a hammer after casting.

More complex shapes made of concrete are often produced with the aid of silicone molds. In this case, the silicone mold is in the form of a negative model. The mold must then be laboriously produced using a model, which acts as a positive mold for the silicone casting. A model of this type may be produced, for example, using conventional techniques, such as milling in wood or plastic or using additive methods. To lend the silicone casting mold the necessary strength, an additional substructure is necessary, which makes the method even more complex. Like with the formwork boards, a mold release agent must frequently be applied to the silicone casting mold prior to casting.

The silicone mold may then be removed after the casting material solidifies by simply pulling the part away from the mold. However, the substructure must first be removed for this purpose.

These two methods cannot be used for molds which have been produced by powder-based 3D printing with the aid of cold resin binder.

Due to the porosity of the molds, conventional mold release agents are unable to prevent the casting material from penetrating the mold. Instead, the mold release agents infiltrate the molded part and enter the interior without having any effect on the surface.

SUMMARY

A number of terms in the invention are explained in greater detail below.

Within the meaning of the invention, "3D printing method" relates to all methods known from the prior art which facilitate the construction of components as three-dimensional molds and are compatible with the method components and devices described.

Within the meaning of the invention, "selective binder application" or "selective binder system application" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Molded body" or "component" within the meaning of the invention are all three-dimensional objects that are produced with the aid of the method according to the invention and/or the device according to the invention and which have a nondeformability.

All materials known for powder-based 3D printing, in particular sands, ceramic powders, metal powders, plastics, wood particles, fibrous materials, celluloses and/or lactose powders, may be used as "particulate materials." The particulate material is preferably a dry, free-flowing powder. However, a cohesive, firm powder may also be used.

"Build space" is the geometric place in which the particulate material feedstock grows during the build process by repeated coating with particulate material. The build space is generally delimited by a base, the building platform, by walls and an open cover surface, the build plane.

"Casting material" within the meaning of this invention is any castable material, in particular materials in which no temperatures arise during processing which could weaken a cold resin binding and which thus promote breakout from the mold.

A "concrete material" within the meaning of this invention is a mixture of an additive (e.g., sand and/or gravel or the like) and a hydraulic binder, the mixing water being used up by the solidification reaction. A concrete material is also a possible casting material.

"Porosity" within the meaning of the invention is a labyrinthine structure of cavities which occur between the particles bound in the 3D printing process.

The "seal" acts at the geometric boundary between the printed mold and the cavity to be filled. It superficially closes the pores of the porous molded body.

"Black wash" designates a fluid which contains particles and does not seal the porosity but only reduces the pore diameter on the surface of the mold.

"Hydrostatic pressure" is used as a general term for all pressures which arise by the action of the fluid column of the casting material.

"Low strength" in terms of sealing means that the seal does not resist any strong forces during breakout from the mold.

"Cold casting methods" are understood to be, in particular, casting methods in which the temperature of the casting mold and the core do not reach the decomposition or softening temperature of the molding material before, during and after the casting process. The solidity of the mold is not influenced by the casting process. The opposite thereof would be metal casting methods, in which the mold is, in general, slowly destroyed by the hot casting compound.

The term "treated surface" designates a surface of the casting mold, which is treated in a preferably separate step after the mold is printed and cleaned. This treatment is frequently an application of a substance to the surface and thus also in the areas of the mold or core near the surface. All conceivable methods may be considered for application.

It is desirable from an economical point of view to implement casting molds for cold casting by means of 3D-printed molds, in particular for more complex molds.

The object of the present invention is to provide a casting mold, in particular for use in cold-casting methods, which is produced with the aid of a powder-based layering method, the final casting mold having a treated surface.

The treated surface may, for example, prevent the casting material from penetrating the molded body, due to the hydrostatic pressure or capillary effects.

Moreover, it could also be that the forces are low during the breakout of porous bodies from the mold due to the surface treatment, since the seal may be drawn out of the pores of the porous molded material by the mold breakout process, and air may then subsequently flow through the porous mold.

Preferred specific embodiments are illustrated below.

According to one preferred specific embodiment of the invention, the treated surface (or the surface treatment) comprises a sealing, a coating, a processing and/or another treatment.

The treated surface should preferably have a lower porosity than the casting mold after it is produced.

In another aspect, the invention relates to a use of the casting mold according to the invention to produce cold-cast parts as a lost-wax casting mold and/or as a continuous casting mold.

In particular, the casting molds according to the invention may be used to produce concrete cast parts and/or cold-cast polymer components.

In yet another aspect, the present invention relates to a method for producing casting molds, in particular for use in cold-casting methods, the casting mold being built with the aid of a powder-based layering method, and the surface of the casting mold being treated.

A powder bed-based 3D printing method is preferably used for the layering method, and a cold resin binding system is even more preferably used.

If the surface is additionally sealed with a hydrophobic material, as needed, the penetration of the casting material into the pores of the casting mold may be effectively limited.

Another possibility is to modify the porosity of the surface of the casting mold with the aid of an infiltrate.

This may be done, for example, with the aid of an epoxy resin, a polyurethane, an unsaturated polyester, a phenol/resol resin, an acrylate and/or a polystyrene.

It is furthermore possible to modify the porosity of the surface with the aid of a black wash and/or dispersion, in particular a zirconium oxide-, aluminum oxide-, calcium oxide-, titanium oxide-, chalk- or silicic acid-based black wash and/or a plastic-, cellulose-, sugar-, flour- and/or salt-based solution.

The porosity of the surface may furthermore be modified or sealed with the aid of a grease, oil, wax and/or hot water-soluble substances.

BRIEF DESCRIPTION OF THE DRAWINGS

Brief description of the figures, which represent preferred specific embodiments.

DETAILED DESCRIPTION

Figure 1:
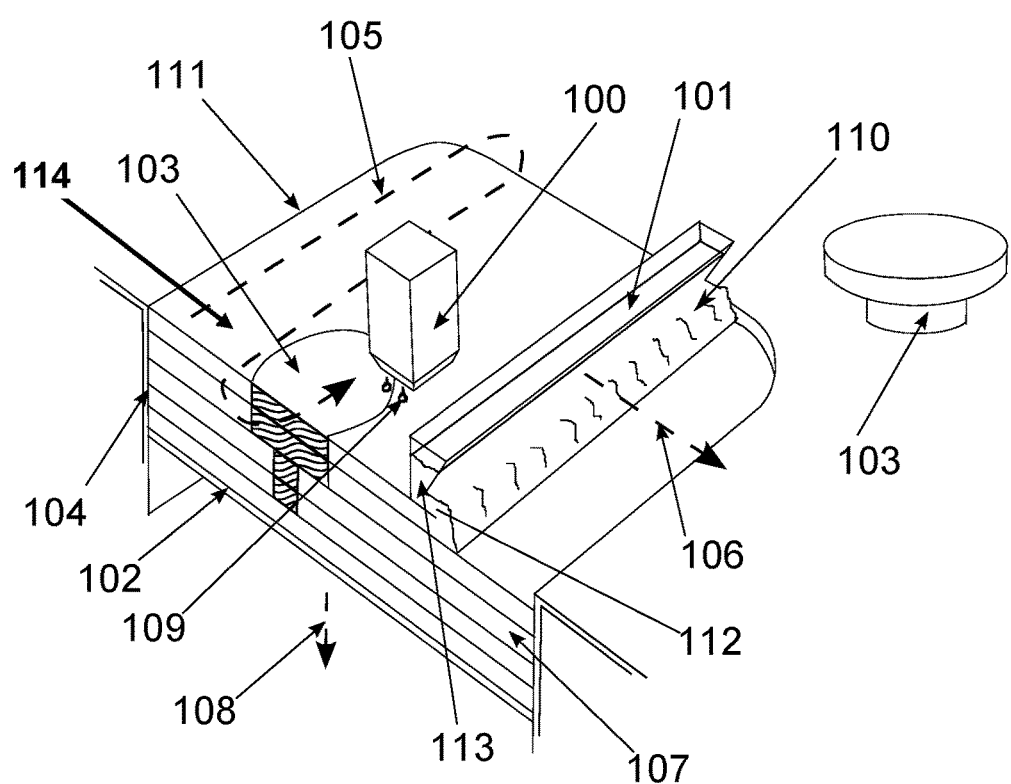
FIG. 1: shows a schematic representation of the components of a powder-based 3D printer in a sectional isometric view.

One example of a device for producing a molded part according to the present invention includes a powder coater (101). Particulate material is applied thereby to a building platform (102) and smoothed (FIG. 1). The applied particulate material may be made from a wide range of materials; according to the invention, however, sand is preferred for reasons of its low cost. This sand is precoated, for example, with an activator component. The height of powder layers (107) is determined by the building platform (102). It is lowered after one layer has been applied. During the next coating operation, the resulting volume is filled and the excess smoothed. The result is a nearly perfectly parallel and smooth layer of a defined height.

After a coating process, a fluid is printed onto the layer with the aid of an ink-jet print head (100). The print image corresponds to the section of the component in the present build height of the device. The fluid strikes and slowly diffuses into the particulate material.

The fluid reacts with the activator in the particulate material to form a polymer. The latter binds the particles to each other.

In the next step, the building platform (102) is lowered by the distance of one layer thickness. The steps of layer construction, printing and lowering are now repeated until the desired component (103) is completely produced.

The component (103) is now complete, and it is located in the powder cake (114). In the final step, the component is freed of the loose particulate material and cleaned with compressed air.

A component produced in this manner forms the basis for the present invention. The use of these molds may be divided into two areas: single-use molds and multiple-use molds. According to the present invention, they may be used in cold-casting methods.

Figure 2:
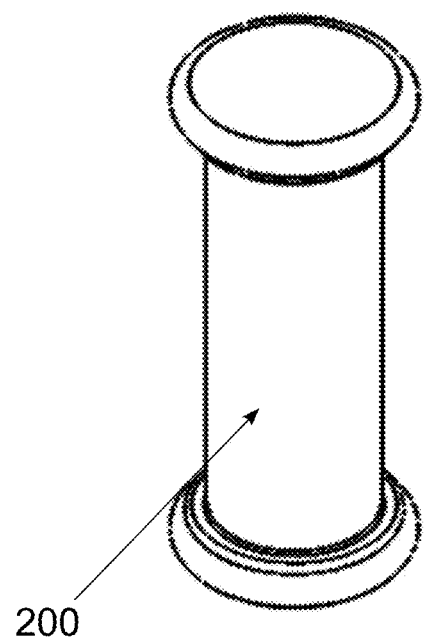
FIG. 2: shows a representation of a simple cast part without undercuts.
Figure 3:
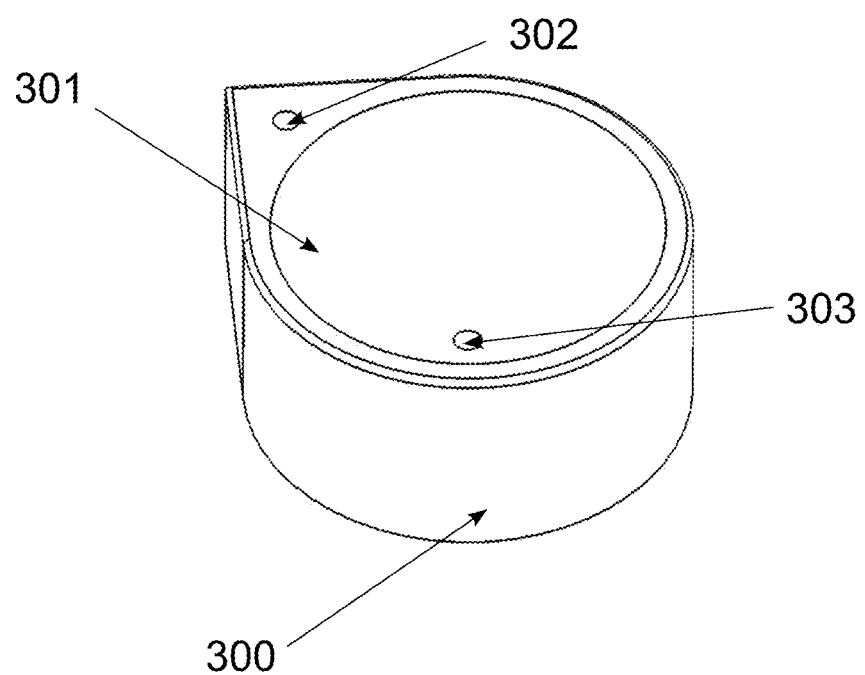
FIG. 3: shows a representation of a complex cast part, including undercuts.

FIG. 2 shows a simple cast part (200). It is economical to achieve multiple castings with the aid of one mold. A larger and more complex component is represented, for example, by a sink (300) in FIG. 3. The sink has a bowl-shaped formation (301) in its middle. An opening (303) for the later drain is situated in its center. Another opening (302) for the faucet is situated in the rectangular part of the basin.

Figure 6:
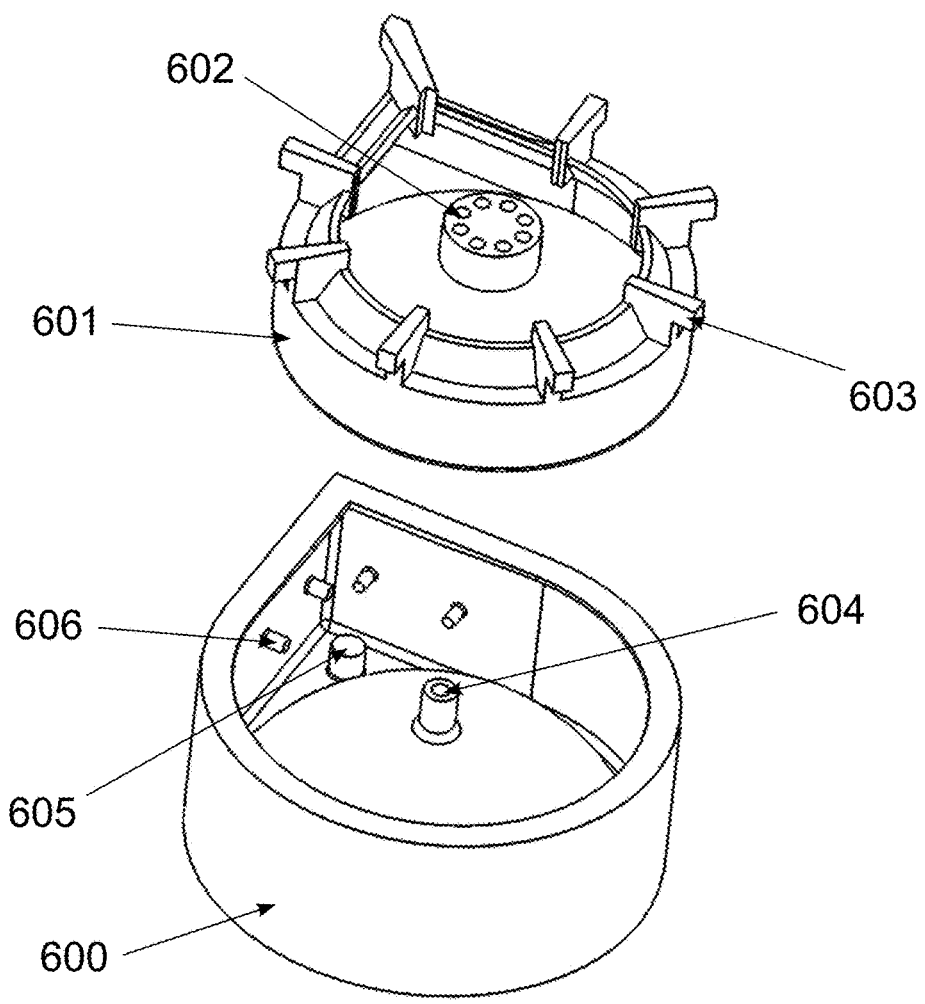
FIG. 6: shows a representation of a set of single-use molds for producing the complex cast part.

As a single-use mold (600), breakout is achieved by destroying the mold. The mold is expediently produced as a thin bowl. The structure is additionally reinforced by means of ribbing to withstand the hydrostatic pressures. FIG. 6 shows a mold of this type. The mold is designed in two parts (600, 601).

Figure 4:
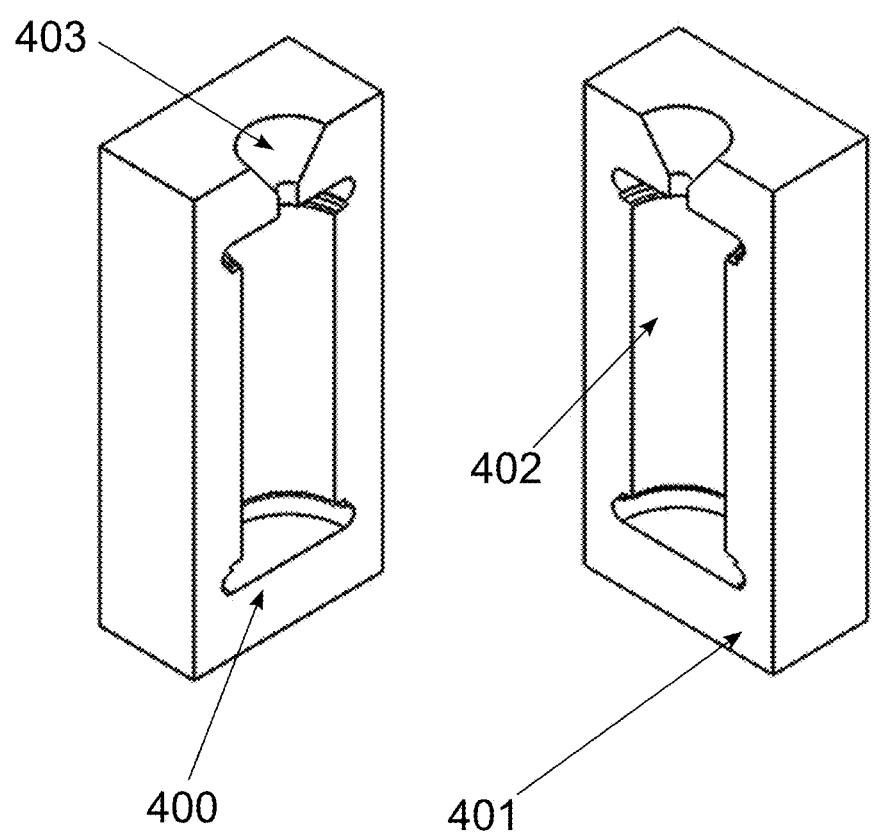
FIG. 4: shows a representation of a set of multiple-use molds for producing the simple cast part.
Figure 5:
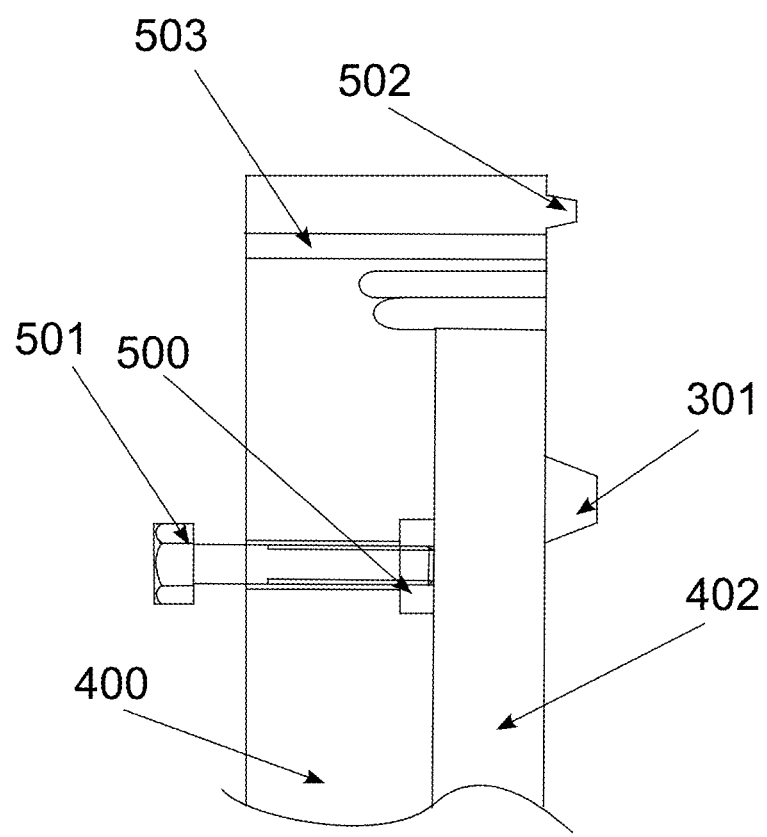
FIG. 5: shows a sectional representation of ejectors and assembly aids for a multiple-use casting mold.

FIG. 4 shows a multiple-use mold. It comprises two halves (400, 401), each of which has a thick-walled design, and into which the cavity (402) for the casting material is introduced. A sprue (403) is also provided.

The mold (400, 401; 600, 601) may be produced, for example, from a sand having an average grain size of 140 µm, which was premixed with a hardener for a so-called cold resin in the amount of 0.3 wt %. The binding process preferably takes place with a concentration of cold resin in the range of 1.0 to 2.5 wt %.

After the printing process, the mold may be removed from the loose sand and cleaned.

Different methods may be used to modify the pore size. For example, an infiltration with a two-component polymer is possible. However, the material must be used in such a way that, according to the invention, pores which facilitate easy mold breakout remain on the surface after treatment. For this purpose, the mold is treated, for example, with an adapted seal, which is processed at room temperature and does not develop high strengths.

It is likewise possible to additionally use a black wash from the metal casting field. Smaller particles are applied to the surface in this case. The effective pore cross section is modified thereby. As a result, it is possible to prevent, for example, the mechanically weak seal according to the invention from being pressed into the mold due to high hydrostatic pressures.

Grease may be used as a simple seal according to the invention. The grease may be applied to the mold by spreading or spraying it on. The grease muse be suitably selected for the task. Too heavy a grease may be difficult to process. Too thin a grease or oil infiltrates the mold and thus no longer provides a sealing function.

After spreading or brushing, the grease may be additionally smoothed. A superficial application of heat is suitable for this purpose. This may be done, for example, with a hot air gun or a blowtorch. Thoroughly heating the mold is not desirable, since this may lead to the possibility of leaks in the seal.

The use of wax is also possible according to the invention. The wax is expediently liquefied by heating for processing. The low viscosity must be increased by means of a thickener; for example, polystyrene microgranulates may be used for this purpose. It is also possible to use hydrophobic solvents, such as the alkanes or benzine, to create a wax solution whose viscosity may be effectively adjusted.

A seal made from hot water-soluble polyvinyl alcohol may also be created. This material is dissolved in hot water and applied to the preheated mold. The mixing water of a concrete is unable to attack the seal.

Figure 7:
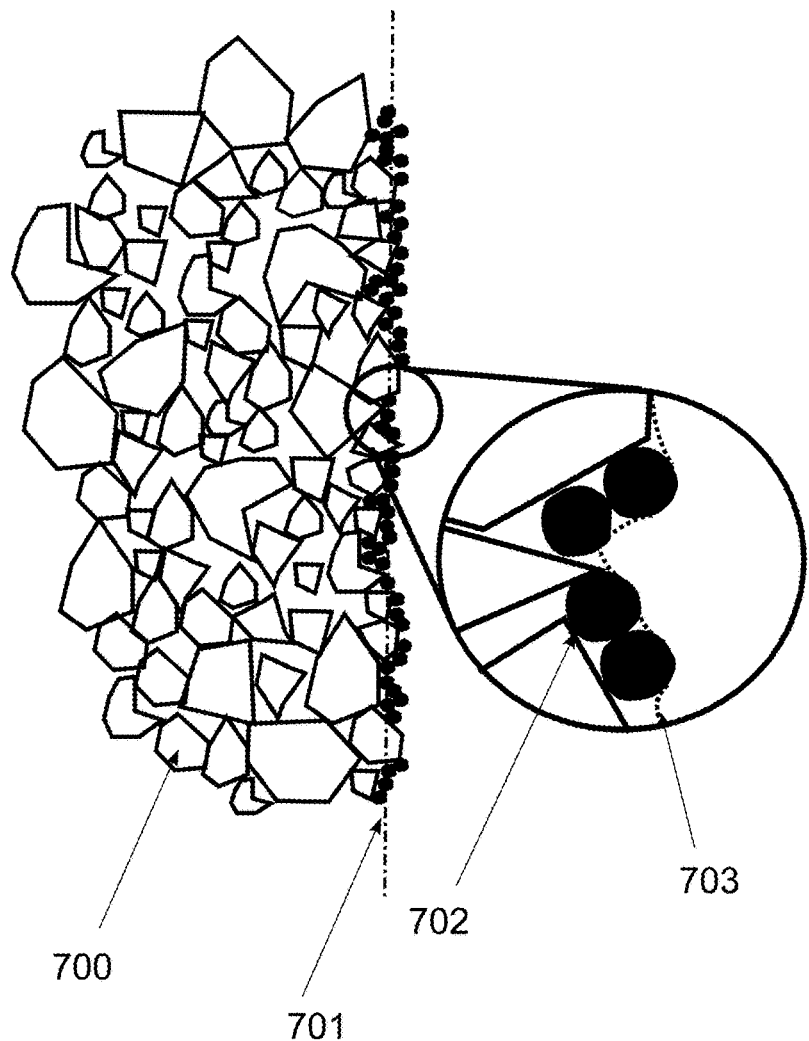
FIG. 7: shows a sectional view of a component treated according to the invention.

FIG. 7 shows the process on the microscopic level. The molded body is constructed with the aid of particles (700), which are bonded to each other. Fine particles (702) collect on the geometric component boundary (701) in the event of a black-washed component. The seal (703) seals the surface water-tight.

The molds prepared in this manner are subsequently equipped with additional function components.

For example, ejectors (500, 501) may be inserted into multiple-use molds for easier breakout from the mold. Depending on the expected breakout forces, the seat of the ejectors in the printed mold was reinforced in advance, e.g., using an epoxy resin infiltration. The ejectors may be designed as bolts (501), which engage with a nut (500), which may be countersunk into the printed part. A force is then generated between the mold and the cast part by applying a torque to the bolt.

The mold may also be provided with centering pins. These pins minimize the offset between the mold halves and thus ensure a precise cast part.

Some structures known from metal casting molds may be provided directly on the printed part. Thus, centering elements (603) may be implemented, and labyrinth seals (502) may be mounted for a better sealing action between the mold halves.

The reinforcement is inserted into the mold cavity (402) before the molds are closed. It is expediently held at a distance relative to the mold with the aid of plastic or concrete supports. In this state, empty conduits may also be inserted into the mold for later introduction of electric lines or other media.

The assembly of the molds may be facilitated by bores (503) in the molds. Bolts, which apply the compressive forces onto critical mold areas in a targeted manner, may be guided through these bores. Additional plates may also be screwed on, which reinforce the mold against the casting forces.

Casting takes place through mounted sprues (403) or material shafts. Depending on the technique and casting material used, additional ventilation bores (602) may also be introduced. If a vibrator is to be inserted after casting to compress the casting material, an access is provided in the mold. Mold parts (e.g. 601), which are able to float, due to the pressure of the casting material, must be prevented from changing position, e.g. by being weighted down.

After the casting process, the part rests for up to several days, depending on the binding time of the casting material. The demolding process then takes place.

Figure 8:
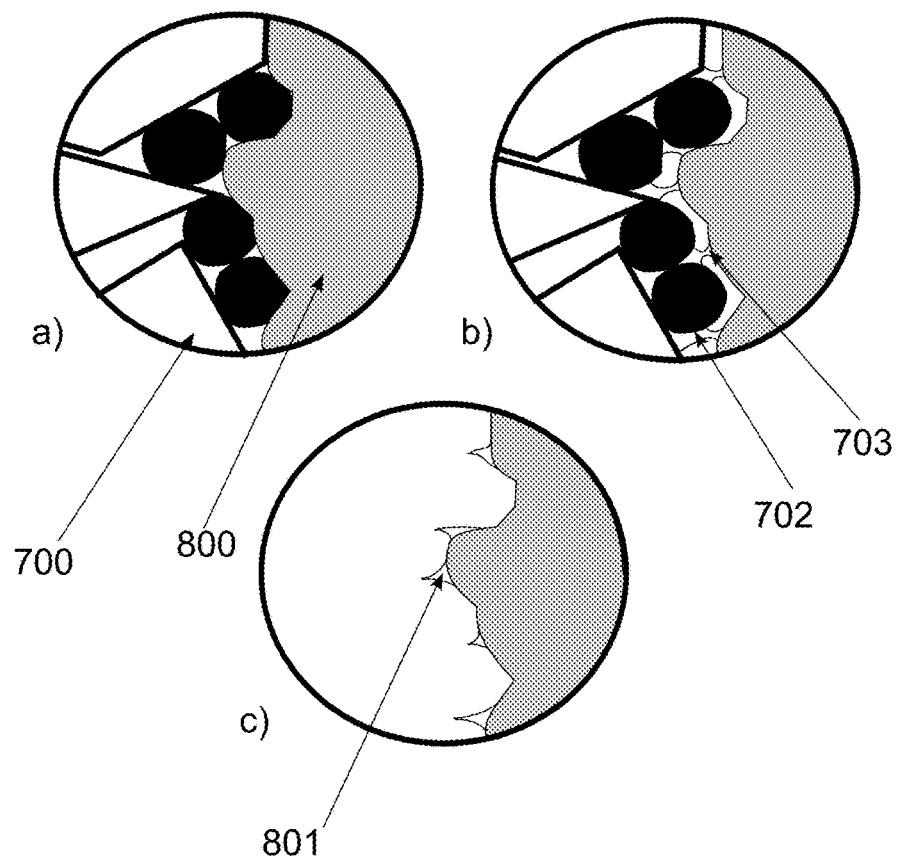
FIG. 8: shows an illustration of the mold breakout process with a treatment according to the invention.

Due to the low strength of the seal, the latter is easily removed from the pores of the mold during breakout (see FIG. 8). This process may be assisted by heating the mold together with the cast part. As a result of the low separating forces, even delicate cast parts may be safely broken out of the mold.

If a single-use mold is used, the mold may be pre-damaged by hitting it with a hammer in a targeted manner. Depending on the wall thickness of the mold, the actual separation process is carried out with the aid of a putty knife or another flat tool. The mold may also be separated from the cast body by means of sand blasting. The selection of the blasting material and the pressure must be adapted according to the hardness of the casting material, so that the casting material is not damaged.

The multiple-use mold is preferably placed in a furnace before breakout and heated overnight to a temperature of, for example, 60° C. Air circulation should be avoided to prevent drying out if concrete is used as the casting material.

After the furnace process, the bond between the mold and cast part is stressed by tightening the bolts on the ejectors. The mold then usually opens with the aid of slight vibrations or hammer blows.

After the casting process, the sealing medium (801) must be removed from the cast part (800). If grease is used, soaps and washing pastes for cleaning oils and greases are helpful. Hand washing paste that includes cleansing particles is particularly preferred in this case.

After casting, the parts are further processed as in the case of conventional production methods. The usual methods such as grinding or sand blasting are used for surface modification.

LIST OF REFERENCE NUMERALS

100 Print head
101 Coater
102 Building platform
103 Component
104 Build container
105 Print head path
106 Coater path
107 Powder layers
108 Direction of building platform movement\
109 Dosed droplets
110 Powder roll
111 Build space boundary
112 Coater gap
113 Coater stock
114 Powder Cake
200 Simple cast part
300 Complex cast part, sink
301 Bowl-shaped sink area
302 Hole for faucet
303 Hole for drain
400 Casting mold, top box
401 Casting mold, bottom box
402 Cavity for casting material
403 Sprue
500 Nut
501 Bolt
502 Labyrinth seal
503 Bore for assembly bolts
600 Sink mold, bottom box
601 Sink mold, top box
602 Ventilation bores
603 Mold centering element and contact point
604 Mold core for drain
605 Mold core for faucet
606 Mold cores for wall mounting
700 Particle
701 Geometric mold boundary
702 Particle of the black wash
703 Seal
800 Cast part
801 Drawn-out seal

What is claimed is:

1. A method comprising the steps of:
   producing a casting molds for use in cold casting methods at temperatures where the casting mold is not destroyed, wherein the casting mold is built with the aid of a powder-based layering method and has a porous molded body,
   treating a porous surface of the casting mold with a sealant which closes pores of the molded body and seals the surface water-tight,
   cold casting a part at a temperature where the casting mold is not destroyed, and
   removing the part from the casting mold;
   wherein the layering method is a powder bed-based 3D printing method and includes:
   applying a powder-based layer using a coater, wherein the powder-based layer includes a particle precoated with an activator; and
   selectively printing a fluid on the powder-based layer with a print head.

2. The method of claim 1, wherein the porosity of the surface is modified by an epoxy resin, a polyurethane, an unsaturated polyester, a phenol/resol resin, an acrylate and/or a polystyrene.

3. The method of claim 1, wherein the porous surface is modified by a black wash or dispersion prior to the step of treating with a sealant, wherein the black wash includes a zirconium oxide, aluminum oxide-, calcium oxide-, titanium oxide-, chalk- or silicic acid-based black wash and the dispersion includes a plastic, cellulose, sugar-, flour and/or salt-based solution.

4. The method of claim 1, wherein the porosity of the sealant includes a grease, an oil, a wax, or a hot water-soluble substance.

5. The method of claim 1, wherein a cold resin binding system is used for the layering method.

6. The method of claim 5, wherein the surface is sealed with a hydrophobic material.

7. The method of claim 5, wherein the porosity of the surface is modified by an infiltrate prior to the step of treating with a sealant.

8. The method of claim 5, wherein the porosity of the surface is modified by an epoxy resin, a polyurethane, an unsaturated polyester, a phenol/resol resin, an acrylate and/or a polystyrene.

9. The method of claim 5, wherein the porosity of the surface is modified by a zirconium oxide-, aluminum oxide-, calcium oxide-, titanium oxide-, chalk- or silicic acid-based black wash prior to the step of treating with a sealant.

10. The method of claim 5, wherein the porosity of the surface is modified or sealed by means of a hot water-soluble substance.

11. The method of claim 1, wherein the cold casting methods is for producing a concrete cast part.

12. The method of claim 1, wherein the cold casting method is for producing a cold-cast polymer component.

13. The method of claim 1, wherein the
particle is a sand particle.

14. The method of claim 13, wherein the fluid reacts with the activator on the powder-based layer to form a polymer that binds the sand particles together.

15. A method comprising the steps of:
producing a casting molds for use in cold casting methods at temperatures where the casting mold is not destroyed, wherein the casting mold is built with the aid of a powder-based layering method,
treating a porous surface of the casting mold,
cold casting a part at a temperature where the casting mold is not destroyed, and
removing the part from the casting mold;
wherein the layering method includes applying a powder-based layer using a coater,
wherein the powder-based layer includes a sand particle precoated with an activator; and
selectively printing a fluid on the powder-based layer with an ink jet print head;
wherein the fluid reacts with the activator on the powder-based layer to form a polymer that binds the sand particles together.

16. The method of claim 15, wherein the casting mold includes a surface modified by an epoxy resin, a polyurethane, an unsaturated polyester, a phenol/resol resin, an acrylate, or a polystyrene, for reducing the porosity of the surface.

17. The method of claim 15, wherein the casting mold includes a surface modified by a black wash or a dispersion, for reducing the porosity of the surface, wherein the black wash includes a zirconium oxide, aluminum oxide, calcium oxide, titanium oxide, a chalk, or a silicic acid, and the dispersion includes a plastic, a cellulose, sugar, flour, or a salt.

* * * * *